Dec. 9, 1947.   W. R. CURTISS   2,432,388
DIRECTIONAL SIGNAL-SYSTEM FOR VEHICLES
Filed March 13, 1945
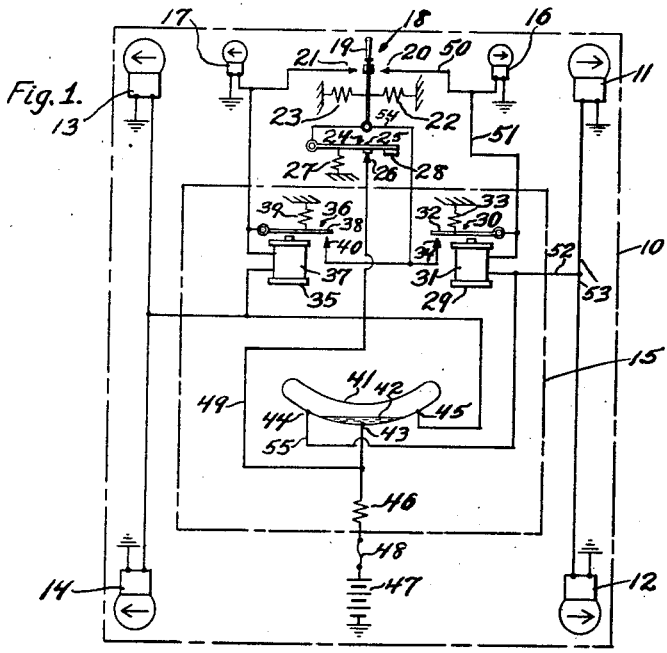
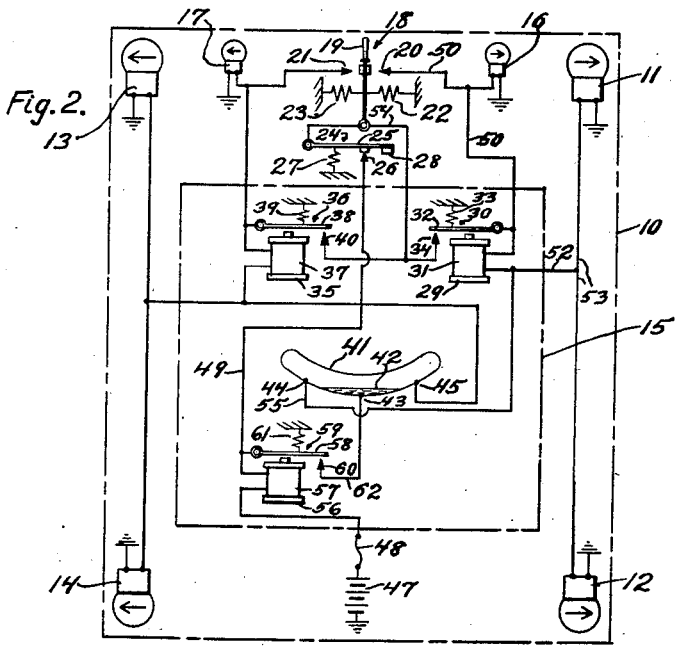
INVENTOR
WILLIAM R. CURTISS
By Seymour Earle Nichol
ATTORNEYS Patented Dec. 9, 1947

2,432,388

UNITED STATES PATENT OFFICE 2,432,388

DIRECTIONAL SIGNAL SYSTEM FOR VEHICLES

William R. Curtiss, Meriden, Conn., assignor to Great American Industries, Inc., Meriden, Conn., a corporation of Delaware Application March 13, 1945, Serial No. 582,465

6 Claims. (Cl. 177—339)

1

This invention relates to improvements in directional or direction indicating signal systems for vehicles for properly indicating right and left turns.

One object of this invention is to provide an improved directional signal system for vehicles in which control means is automatically operable by centrifugal force while the vehicle is making a turn, to properly actuate the directional signal means, and when the vehicle completes the turn, the absence of action by centrifugal force automatically causes the control means to shut off the directional signal means.

Another object of this invention is to provide an improved directional signal system for vehicles in which control means including a primary switch which is optionally closable by the operator of the vehicle in either of two ways, to initially actuate the one or the other of the right and left-directional signal means, after which automatically operable centrifugal switch means takes over and continues the actuation of the signal means which has first been operated by the primary switch means and then after completion of the turn, automatically causes cessation of operation of such signal means.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of this disclosure, in which certain ways of carrying out the invention are shown for illustrative purposes:

Fig. 1 is a schematic view illustrating one way of carrying out the invention; and Fig. 2 is a schematic view of another way of carrying out the invention.

Referring to Fig. 1 of the drawings, the broken line outline or enclosure 10 indicates an automobile or other vehicle, provided with respectively front and rear right-directional signal means or signal indicators or direction indicators in the form of signal lamps 11 and 12 and with respectively front and rear left-directional signal means or signal indicators or direction indicators in the form of signal lamps 13 and 14. A broken line outline or enclosure 15 indicates a box or other container in which may be placed, if so desired, all of the mechanisms illustrated

2 within the broken line enclosure 15. It will be seen that the mechanisms located in the box 15 have no operational connection with any of the other mechanisms of the signal-system other than electric wire connections, and that, therefore, the box 15 can be placed in any desired location in or on the vehicle.

16 is a right-directional pilot lamp and 17 is a left-directional pilot lamp which two pilot lamps 16 and 17 will preferably be located within the view of the operator of the vehicle. Each pilot lamp could be as small as two candle power, and each signal lamp could be fifteen candle power or more or less.

18 is a primary or initiating single-pole double-throw switch, the switch arm 19 of which is normally held in open intermediate position between two switch contacts 20 and 21 by any suitable yielding means, such for example, as the springs 22 and 23, so that if the switch arm 19 is moved into contact with either of contacts 20 or 21 and then released, the switch arm 19 is automatically returned by the springs 22 and 23 to its central open position shown in Fig. 1. A release switch 24 has its switch arm 25 normally yieldingly held closed against the switch contact 26, by any suitable means such as the spring 27 and may, if desired, have the switch arm provided with a press button 28 for convenience. Both of the switches 18 and 24 would ordinarily be located within easy reach of the operator of the vehicle.

29 is a right directional relay which has what is known in the art as a lock-in switch 30, although it is pulled to and held in its closed-circuit position solely by the electromagnetic action of the current passing through the coil of the relay. When suitable electric current passes through the coil 31 of relay 29, the switch arm 32 of switch 30 is pulled down against action of the spring 33 and into contact with the switch contact 34, in the lock-in or hold-in position. Similarly, the left-directional relay 35 has a lock-in switch 36. When suitable electric current passes through the coil 37 of relay 35, the switch arm 38 of switch 36 is pulled down against action of the spring 39 and into contact with the switch contact 40 in the lock-in position.

41 is a single-pole double-throw centrifugal switch, in the form shown being a mercury switch which will be arranged to extend transversely of the vehicle. Mercury 42 is normally in contact with the central contact 43 of the switch 41, and when the vehicle makes a right turn, for example, the centrifugal force set up by the turning action of the vehicle, will cause the mercury 42 to flow toward the left of Fig. 1 to thus extend over both the center contact 43 and the left contact 44. If instead of the vehicle making a right turn, it makes a left turn, then the mercury 42 is moved toward the right to cover the center contact 43 and the right contact 45.

46 is a resistor or resistance means which, together with the two directional relays 29 and 35, can be provided with such characteristics that when electric current passes from the battery 47 through the resistor 46 to both of the relays 29 and 35 in multiple, the current will not be able to close either lock-in switch of either relay, but either relay will actuate its lock-in switch to closed circuit or lock-in position if it is the only relay through which current is flowing. This can be accomplished by giving the resistor 46 such a resistance value that if current is flowing through all of the four direction-indicators at the same time, there will be a high enough drop in voltage across the resistor 46 to prevent both of the relays 29 and 35 from maintaining their lock-in switches in closed position. Where tungsten-filament lamps are used as the direction indicators, the value of resistor 46 can be established so that sufficient drop in voltage to cause relays 29 and 35 to become inoperative, would be attained only during the momentary high current inrush to the cold tungsten filaments of the direction indicators. Also, each of the relays 29 and 35 can be given such characteristics, well known to those skilled in the art, that if either of the relays is receiving all of the current through the resistor 46 at a given moment, and thus is holding its lock-in switch in lock-in or closed position, and if now the circuit is closed in multiple through the other relay, then the drop of voltage at the terminals of the coil of the first mentioned relay and the consequent lower current therethrough, will be insufficient to hold the lock-in switch arm in its lock-in position against the tension of the spring of the lock-in switch arm, with the consequence that the lock-in switch arm will swing to open-circuit position.

*Operation of the construction of Fig. 1*

Assuming that the vehicle 10 is proceeding in a longitudinal straight line direction along a street, and with all of its directional signal lamps 11, 12, 13 and 14 in non-lighted condition, if now the operator of the vehicle desires to make a right turn, he will move the switch arm 19 of the primary switch 18, to the right into contact with the switch contact 20, thus closing the circuit and causing current from the battery 47 to pass through the resistor 46, through the wire 49, through the normally closed release switch 24, through the primary switch arm 19, the right contact 20, the wire 50, and through the pilot lamp 16 to the ground and thus back to the battery 47, and also through the wire 51, the coil 31 of the right-directional relay 29, the wires 52 and 53 and thus through the right-directional signal lamps 11 and 12 to the ground, and thus back to the battery 47, thus lighting the signal lamps 11 and 12 and also causing the relay 29 to pull down the lock-in switch arm 32 to lock-in or closed position against the contact 34, and thus permitting the current to pass from the switch-arm 19 through the wire 54, the contact 34 and switch arm 32, the coil 31, and the wires 52 and 53 and the signal lamps 11 and 12 to the ground, thus supplying current to the coil 31 of the relay 29 to cause the relay to hold the lock-in switch arm 32 in closed or locked-in position without requiring any current to pass across from the primary switch arm 19 to the contact 20. Thus it will be seen, that only momentary operation of the primary switch arm 19 into contact with the contact 20 is required to initiate the lighting of the signal lamps 11 and 12 and pilot lamp 16, and that although the springs 22 and 23 promptly move the switch arm 19 back to its central open-circuit position, as soon as the arm 19 is released by the operator of the vehicle, since the current is now passing through the wire 54 and thus through the coil 31 of the relay 29, the relay continues to hold the lock-in switch arm 32 in its lock-in position to thus continue operation of the signal lamps 11 and 12 and pilot lamp 16.

Assuming now that the vehicle has proceeded in a straight line and has now started to make the right turn, the mercury 42 will be swung to the left by the centrifugal action set up by the right turn to cause the mercury to bridge the contacts 43 and 44 of the mercury switch 41 to thereby permit the electric current from the battery to flow from the mercury swtch contact 44 through the wire 55, the wires 52 and 53, and through the signal lamps 11 and 12 to ground, thus shunting most of the current past the relay 29 without much of the current going through the coil 31 of the relay, with the result that the lock-in switch arm 32 is moved by its spring 33 to open-circuit position. A small amount of current sufficent to operate the pilot lamp 16, would at the same time pass through the coil 31, the wire 51, and the wire 50 to the pilot light 16 to the ground.

Thus it will be seen that after the right turn is once started so that current passes through the two contacts 43 and 44 of the centrifugal switch 41, the centrifugal switch takes over operation of the signal lights 11 and 12 and pilot light 16, inasmuch as it is now the sole path by which current reaches the lights 11 and 12 and 16. Therefore, as soon as the right turn is completed and the vehicle is again moving in a straight direction longitudinally of itself, the mercury 42 moves back to its central position as illustrated in Fig. 1 thereby breaking the circuit so that no current now flows through the contact 44, thus interrupting all current to the signal lights 11 and 12 and the pilot light 16 which thereupon return to their normal unlighted condition.

If instead of the operator desiring to make a right turn, he desires to make a left turn, he moves the primary switch arm 19 into contact with the left contact 21 to thereby light the left-directional signal lamps 13 and 14 and pilot lamp 17, and the left-directional relay 35 would have closed its lock-in switch 36 to thus take over the supplying of current to the signal and pilot lamps 13, 14 and 17 in a similar way to that hereinbefore described concerning the right-directional lamps 11, 12 and 16 when making a right turn. And as soon as the actual left turn is started, the centrifugal switch 41 causes the mercury 42 to close across the contacts 43 and 45 to thus take over actuation of the signal lamps 13 and 14 and pilot lamp 17, and after the vehicle completes the left turn and again resumes its normally straight ahead travel, the signal lights 13 and 14 and the pilot light 17 go out in the same manner as was described concerning the corresponding right-directional lights 11, 12 and 16 during a right turn.

If after the operator moved the primary switch arm 19 to the right against contact 20 for a right turn, he changed his mind, and instead of making the right turn, desired to make a left turn, and if he thereupon swung the arm 19 from its right contacted position against the contact 20, to its left-contacted position against the contact 21 without first pushing the release switch 24 to temporary open-circuit position to first extinguish the right-directional lights 11, 12 and 16, then due to the combined effect of the resistance of the resistor 46, and the momentary low resistance of the cold tungsten filaments of the left-directional lamps 13 and 14 and the consequent momentary high current inrush to the cold tungsten filaments of the lamps 13 and 14, there would be so little current pass through the coil of the right relay 29 that the switch arm 32 of the right relay 29, which at first had been closed by the operator swinging the primary switch arm 19 to the right, would now spring open, with the consequence that the right-directional signal lamps 11 and 12 and pilot lamp 16 which originally were lighted, would have gone out, and the left directional signal lamps 13 and 14 and pilot lamp 17 will now be lighted and maintained lighted by the lock-in switch 36, so that the signals now properly indicate the left turn to be made and the left-directional signal means is taken over and controlled by the centrifugal switch 41 just the same as if the primary switch arm 19 had originally been moved only to the left in contact with contact 21.

If the operator operates the switch arm 19 to the right to engage contact 20 and thus light the right-direction-indicators 11 and 12, for example, but instead of actually making a right turn he makes a left turn without first swinging the switch arm 19 to the left against contact 21, then just as soon as the left turn starts, the centrifugal switch 41 will close the circuit directly through the contacts 43 and 45 to the left direction-indicators 13 and 14 to thus light the latter. And as the consequent drop in voltage across the resistor 46 prevents sufficient current from passing through the right relay 29 to hold its lock-in switch closed, the latter will be opened by its spring to thus extinguish the right direction-indicators 11 and 12.

If a suitable resistor 46 were not employed in the electric circuit, and if the battery 47 were able to supply ample current to both relays 29 and 35 to operate both of their lock-in switches at the same time, then in such circumstance, if the primary switch arm 19 were first moved to the right contact 20 and then to the left contact 21, such action would merely light up all of the signal lights 11, 12, 13 and 14, which, of course, would not be satisfactory. But in this latter assumed situation in the absence of the resistor 46, if after the primary switch arm 19 had been moved into engagement with the right contact 20 to thus light the right-directional signal lamps 11 and 12 but before the vehicle started its right turn, the operator decided that he did not want to make a right turn, but wanted to make a left turn instead, then he could cause all of the mechanisms to function properly by first pressing the button 28 of the release switch 24 which would thus break the entire circuit including that through the relay 29 to thus open the lock-in switch 30 and put out the signal lights 11 and 12, and than upon his moving the primary switch arm 19 into engagement with the left contact 21, the left-directional signal-mechanism including the left-directional signal lights 13 and 14 would be properly actuated all as hereinbefore more fully explained.

*Construction and operation of the construction of Fig. 2*

All of the parts illustrated in Fig. 2 are the same as those illustrated in Fig. 1 and carry the same reference numerals, with the exception that the resistor 46 is omitted and is replaced by a third relay 56, which for convenience may be termed a primary relay. When the primary or initiating switch arm 19 is moved by the operator of the vehicle into contact with either of contacts 20 and 21, electric current from the battery 47 passes through the coil 57 of the relay and by the wire 49 through the various mechanisms as previously described concerning Fig. 1. Passage of the current through the coil 57 of the relay 56 pulls down the switch arm 58 of the lock-in switch 59 against the switch contact 60, against the action of the spring 61, thus closing a branch circuit through the wire 62 to the center contact 43 of the centrifugal mercury switch 41. The coil 57 of the relay 56 can either by itself be of adequate resistance to take the place of the resistor 46 illustrated in Fig. 1, or it can have added in series with it any needed additional resistance to give it the proper resistance value to have the same operational effect as the resistor 46 of Fig. 1.

In the case of a vehicle 10 employing the apparatus illustrated in Fig. 2, the operation will be essentially identical with the operation of the construction illustrated in Fig. 1 in all operations which have previously been described concerning Fig. 1, inasmuch as when the primary switch-arm 19 is moved into engagement with either contact 20 or contact 21, a circuit will be closed through the coil 57 of the primary relay 56 and through the wire 49 to all mechanisms except the centrifugal switch 41, and a circuit will thus also be closed through the lock-in switch 59 of the relay 56 to the center contact 43 of the centrifugal switch 41, which latter will perform its same operation as was previously described concerning Fig. 1. In addition to the primary relay 56 taking the place of the resistor 46 of Fig. 1, it serves to maintain the centrifugal switch 41 dead or nonoperative during normal straight ahead operation of the vehicle, with the result that if the primary switch arm 19 has not been operated by the operator, but is merely left in its neutral position illustrated in the drawings, then inasmuch as there is no current through the normally open lock-in switch 59, and hence no current to the centrifugal switch 41, any swaying of the vehicle to the right or the left will not actuate any signal light notwithstanding that the mercury 42 may be caused by centrifugal force to bridge across any two contacts 43 and 44, or 43 and 45, of the centrifugal switch.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A directional-signal system for vehicles, comprising: right and left-directional signal means for respectively indicating right and left turns to be made by a vehicle; a source of electric current; right and left-directional relay means each having lock-in switch means; primary switch means which is optionally closable in either of two ways for corresponding right or left-directional signal operation, said primary switch means when it is closed for right-directional signal operation, causing electric current to pass through said right-directional relay means and actuate said right-directional signal means, and the passage of electric current through said right-directional relay means causing the latter to close its lock-in switch means which permits electric current to pass to and actuate said right-directional signal means without having to pass through said primary switch means, said primary switch means when it is initially closed for left-directional instead of right-directional signal operation, causing electric current to correspondingly accomplish left-directional signal operation in the same way as hereinbefore specified for right-directional signal operation; centrifugal switch-means; means for connecting said centrifugal switch-means with one terminal of said source of electric current; and means for connecting said centrifugal switch means through said right and left directional signal means with the other terminal of said source of electric current, said centrifugal switch means being automatically operable by centrifugal force when said centrifugal switch means is connected with the other terminal of said source of electric current when said vehicle makes a right turn, to cause electric current to pass to and actuate said right-directional signal means without having to pass through said primary switch means, and without having to pass through said right-directional lock-in switch means to thus cause the latter to open, and automatically operable by centrifugal force when said centrifugal switch means is connected with the other terminal of said source of electric current when said vehicle makes a left turn, to cause electric current to pass to and actuate said left-directional signal means without having to pass through said primary switch means, and without having to pass through said left-directional lock-in switch means to thus cause the latter to open, and said centrifugal switch means being automatically operated upon the completion of a right or left turn, as a result of the cessation of action of centrifugal force, to cause electric current to cease actuation of the corresponding right or left-directional signal means.

2. A directional signal system for vehicles, comprising: right and left-directional signal means for respectively indicating right and left turns to be made by a vehicle; a source of electric current; right and left-directional relay means each having lock-in switch means; primary switch means which is optionally closable in either of two ways for corresponding right or left-directional signal operation and automatically returned to open position, said primary switch means when it is closed for right-directional signal operation, causing electric current to pass through said right-directional relay means and actuate said right-directional signal means, and the passage of electric current through said right-directional relay means causing the latter to close its lock-in switch means which permits electric current to pass to and actuate said right-directional signal means without having to pass through said primary switch means, said primary switch means when it is initially closed for left-directional instead of right-directional signal operation, causing electric current to correspondingly accomplish left-directional signal operation in the same way as hereinbefore specified for right-directional signal operation; centrifugal switch means: means for connecting said centrifugal switch means with one terminal of said source of electric current; and means for connecting said centrifugal switch means through said right and left-directional signal means with the other terminal of said source of electric current, said centrifugal switch means being automatically operable by centrifugal force when said centrifugal switch means is connected with the other terminal of said source of electric current when said vehicle makes a right turn, to cause electric current to pass to and actuate said right-directional signal means without having to pass through said primary switch means, and without having to pass through said right-directional lock-in switch means to thus cause the latter to open, and automatically operable by centrifugal force when said centrifugal switch means is connected with the other terminal of said source of electric current when said vehicle makes a left turn, to cause electric current to pass to and actuate said left-directional signal means without having to pass through said primary switch means, and without having to pass through said left-directional lock-in switch means to thus cause the latter to open, and said centrifugal switch means being automatically operated upon the completion of a right or left turn, as a result of the cessation of action of centrifugal force, to cause electric current to cease actuation of the corresponding right or left-directional signal means.

3. A directional signal system for vehicles, comprising: right and left-directional signal means for respectively indicating right and left turns to be made by a vehicle; a source of electric current; right and left-directional relay means each having lock-in switch means; primary switch means, which is optionally closable in either of two ways for corresponding right or left-directional signal operation, said primary switch means when it is closed for right-directional signal operation, causing electric current to pass through said right-directional relay means and actuate said right-directional signal means, and the passage of electric current through said right-directional relay means causing the latter to close its lock-in switch means which permits electric current to pass to and actuate said right-directional signal means without having to pass through said primary switch means, said primary switch means when it is initially closed for left-directional instead of right-directional signal operation, causing electric current to correspondingly accomplish left-directional signal operation in the same way as hereinbefore specified for right-directional signal operation; centrifugal switch means; means for connecting said centrifugal switch means with one terminal of said source of electric current; and means for connecting said centrifugal switch means through said right and left-directional signal means with the other terminal of said source of electric current, said centrifugal switch means being automatically operable by centrifugal force when said centrifugal switch means is connected with the other terminal of said source of electric current when vehicle makes a right turn, to cause said electric current to pass to and actuate said right-directional signal means without having to pass through said primary switch means, and without having to pass through said right-directional lock-in switch means to thus cause the latter to open, and automatically operable by centrifugal force when said centrifugal switch means is connected with the other terminal of said source of electric current when said vehicle makes a left turn, to cause electric current to pass to and actuate said left-directional signal means without having to pass through said primary switch means, and without having to pass through said left-directional lock-in switch means to thus cause the latter to open; and resistor means connectible in the circuit between said source of electric current and said two directional relay means, said resistor means and said two directional relay means having such characteristics that when electric current from said source of electric current is passing in multiple through both of said directional relay means, neither of said directional relay means is capable of holding its lock-in switch means in, or moving it to, its closed position, and said centrifugal switch means being automatically operated upon the completion of a right or left turn, as a result of the cessation of action of centrifugal force, to cause electric current to cease actuation of the corresponding right or left-directional signal means.

4. A directional signal system for vehicles, comprising: right and left-directional signal means for respectively indicating right and left turns to be made by a vehicle; a source of electric current; right and left-directional relay means each having lock-in switch means; primary switch means which is optionally closable in either of two ways for corresponding right or left-directional signal operation, said primary switch means when it is closed for right-directional signal operation, causing electric current to pass through said right-directional relay means and actuate said right-directional signal means, and the passage of electric current through said right-directional relay means causing the latter to close its lock-in switch means which permits electric current to pass to and actuate said right-directional signal means without having to pass through said primary switch means, said primary switch means when it is initially closed for left-directional instead of right-directional signal operation, causing electric current to correspondingly accomplish left-directional signal operation in the same way as hereinbefore specified for right-directional signal operation; centrifugal switch means; means for connecting said centrifugal switch means with one terminal of said source of electric current; and means for connecting said centrifugal switch means through said right and left-directional signal means with the other terminal of said source of electric current, said centrifugal switch means being automatically operable by centrifugal force when said centrifugal switch means is connected with the other terminal of said source of electric current when said vehicle makes a right turn, to cause electric current to pass to and actuate said right-directional signal means without having to pass through said primary switch means, and without having to pass through said right-directional lock-in switch means to thus cause the latter to open, and automatically operable by centrifugal force when said centrifugal switch means is connected with the other terminal of said source of electric current when said vehicle makes a left turn, to cause electric current to pass to and actuate said left-directional signal means without having to pass through said primary switch means, and without having to pass through said left-directional lock-in switch means to thus cause the latter to open; and normally closed release switch means between said source of electric current and the said two directional relay means through their respective lock-in switch means, and said centrifugal switch means being automatically operated upon the completion of a right or left turn, as a result of the cessation of action of centrifugal force, to cause electric current to cease actuation of the corresponding right or left-directional signal means.

5. A directional signal system for vehicles, comprising: right and left-directional signal means for respectively indicating right and left turns to be made by a vehicle; a source of electric current; right and left-directional relay means each having lock-in switch means; primary switch means which is optionally closable in either of two ways for corresponding right or left-directional signal operation, said primary switch means when it is closed for right-directional signal operation, causing electric current to pass through said right-directional relay means and actuate said right-directional signal means, and the passage of electric current through said right-directional relay means causing the latter to close its lock-in switch means which permits electric current to pass to and actuate said right-directional signal means without having to pass through said primary switch means, said primary switch means when it is initially closed for left-directional instead of right-directional signal operation, causing electric current to correspondingly accomplish left-directional signal operation in the same way as hereinbefore specified for right-directional signal operation; primary relay means between source of electric current and said primary switch means and having a lock-in switch and adapted to close said lock-in switch when said primary switch means is closed; centrifugal switch means; said lock-in switch of the primary relay means when closed, connecting said centrifugal switch means with said source of electric current; said centrifugal switch means being connected between the lock-in switch of said primary relay means and said two signal means, said centrifugal switch means automatically operable by centrifugal force when said vehicle makes a right turn and when said primary switch means is closed for right-directional signal operation, to cause electric current to pass to and actuate said right-directional signal means without having to pass through said primary switch means, and without having to pass through said right-directional lock-in switch means to thus cause the latter to open, and automatically operable by centrifugal force when said vehicle makes a left turn and when said primary switch means is closed for left-directional signal operation, to cause electric current to pass to and actuate said left-directional signal means without having to pass through said primary switch means, and without having to pass through said left-directional lock-in switch means to thus cause the latter to open, and said centrifugal switch means being automatically operated upon the completion of a right or left turn, as a result of the cessation of action of centrifugal force, to cause electric current to cease actuation of the corresponding right or left-directional signal means.

6. A directional signal system for vehicles, comprising: right and left-directional signal means for respectively indicating right and left turns to be made by a vehicle; a source of electric current; right and left-directional relay means each having lock-in switch means; primary switch means which is optionally closable in either of two ways for corresponding right or left-directional signal operation, said primary switch means when it is closed for right-directional signal operation, causing electric current to pass through said right-directional relay means and actuate said right-directional signal means, and the passage of electric current through said right-directional relay means causing the latter to close its lock-in switch means which permits electric current to pass to and actuate said right-directional signal means without having to pass through said primary switch means, said primary switch means when it is initially closed for left-directional instead of right-directional signal operation, causing said electric current to correspondingly accomplish left-directional signal operation in the same way as hereinbefore specified for right-directional signal operation; primary relay means between said source of electric current and said primary switch means and having a lock-in switch and adapted to close said lock-in switch when said primary switch means is closed; centrifugal switch means; said lock-in switch of the primary relay means when closed, connecting said centrifugal switch means with said source of electric current; said centrifugal switch means being connected between the lock-in switch of said primary relay means and said two signal means, said centrifugal switch means automatically operable by centrifugal force when said vehicle makes a right turn and when said primary switch means is closed for right-directional signal operation, to cause electric current to pass to and actuate said right-directional signal means without having to pass through said primary switch means, and without having to pass through said right-directional lock-in switch means to thus cause the latter to open, and automatically operable by centrifugal force when said vehicle makes a left turn and when said primary switch means is closed for left-directional signal operation, to cause electric current to pass to and actuate said left-directional signal means without having to pass through said primary switch means, and without having to pass through said left-directional lock-in switch means to thus cause the latter to open; and resistor means of which said primary relay means forms at least a substantial part, and which resistor means is connectible in the circuit between said source of electric current and said two directional relay means, said resistor means and said two directional relay means having such characteristics that when electric current from said source of electric current is passing in multiple through both of said directional relay means, neither of said directional relay means is capable of holding its lock-in switch means in, or moving it to, its closed position, and said centrifugal switch means being automatically operated upon the completion of a right or left turn, as a result of the cessation of action of centrifugal force, to cause electric current to cease actuation of the corresponding right or left-directional signal means.

WILLIAM R. CURTISS.

REFERENCES CITED

The following references are of record in the file of this patent:

UNITED STATES PATENTS

| Number | Name | Date |
|---|---|---|
| 1,695,712 | Johnson | Dec. 18, 1928 |
| 1,749,429 | Horton | Mar. 24, 1930 |
| 1,763,465 | Hild | June 10, 1930 |
| 1,779,799 | Blum | Oct. 28, 1930 |
| 1,973,299 | Swartwout | Sept. 11, 1934 |
| 2,064,735 | Curtiss | Dec. 15, 1936 |
| 2,100,105 | Lee et al. | Nov. 23, 1937 |
| 2,307,441 | Wyman | Jan. 5, 1943 |